United States Patent [19]

Young

[11] 4,281,610
[45] Aug. 4, 1981

[54] MARINE FENDER AND METHOD OF MAKING THE SAME

[76] Inventor: Melvin R. Young, 708 Solar Dr., Fort Lauderdale, Fla. 33301

[21] Appl. No.: 931,890

[22] Filed: Aug. 8, 1978

[51] Int. Cl.³ ............................................. B63B 21/00
[52] U.S. Cl. ..................................... 114/219; 267/140
[58] Field of Search ................ 114/219, 220; 293/102, 293/103, 109, 120, 122, 136; 267/139–141; 405/212–215; 52/100, 222, 242, 465, 471, 502, 624, 627, 716–718

[56] References Cited

U.S. PATENT DOCUMENTS

| 3,191,568 | 6/1965 | Schroeder et al. | 114/219 |
| 3,449,917 | 6/1969 | Roskopf | 114/219 |
| 3,473,836 | 10/1969 | Halter | 114/219 |
| 3,554,527 | 1/1971 | Hall | 114/219 |
| 3,638,985 | 2/1972 | Barton et al. | 114/219 |
| 3,841,680 | 10/1974 | Muller | 52/116 |
| 3,895,835 | 7/1975 | Thomson | 114/219 |
| 3,950,953 | 4/1976 | Mathews | 114/219 |

Primary Examiner—Trygve M. Blix
Assistant Examiner—Jesús D. Sotelo
Attorney, Agent, or Firm—Shapiro and Shapiro

[57] ABSTRACT

A marine fender comprises a sheet of resilient material that is curved in horizontal cross section and that is attached along opposite vertical edges to a support, such as a piling, so as to provide a deflection space between the sheet and the support. An elastomeric core is mounted on the support within the deflection space, spaced from the sheet, so that the sheet may deflect under impact before engaging the core. Multiple curved sheets may be employed so as to provide a deflection space between successive sheets as well as between a sheet and the support.

23 Claims, 5 Drawing Figures

MARINE FENDER AND METHOD OF MAKING THE SAME

BACKGROUND OF THE INVENTION

This invention relates to marine fenders and the like and is more particularly concerned with an improved fender or bumper for use on pilings and other structures to absorb the impact of boats.

The prior art abounds with resiliently compressible devices to absorb the impact of a boat, for example, upon another structure, such as a dock. See, e.g., U.S. Pat. Nos. 2,331,420; 3,600,896; 3,411,304; Re. 27,589; Re. 27,666; 3,975,916; 2,905,129; 2,433,569; 3,928,701; and 3,895,835. Prior marine fenders, particularly those suitable for use on wooden pilings, have many disadvantages, including complexity, high cost, inadequate impact absorption, and short useful life.

BRIEF DESCRIPTION OF THE INVENTION

It is accordingly a principal object of the present invention to provide an improved marine fender.

Another object of the invention is to provide a marine fender that is simple in construction and yet has higher impact absorption ability and longer effective life than comparable devices of the prior art.

A further object of the invention is to provide an improved method of making a marine fender.

Briefly stated, a preferred embodiment of the invention employs a sheet of resilient conveyor belting material that is curved in cross section and that is attached to a support along opposite edges so as to provide a deflection space between the sheet and the support. An elastomeric core is mounted on the support within the deflection space and is spaced from the sheet. Multiple sheets may be employed so as to provide a deflection space between successive sheets as well as between a sheet and the support.

BRIEF DESCRIPTION OF THE DRAWINGS

The invention will be further described in conjunction with the accompanying drawings, which illustrate preferred and exemplary embodiments, and wherein.

DETAILED DESCRIPTION OF THE PREFERRED EMBODIMENTS

Figure 1:
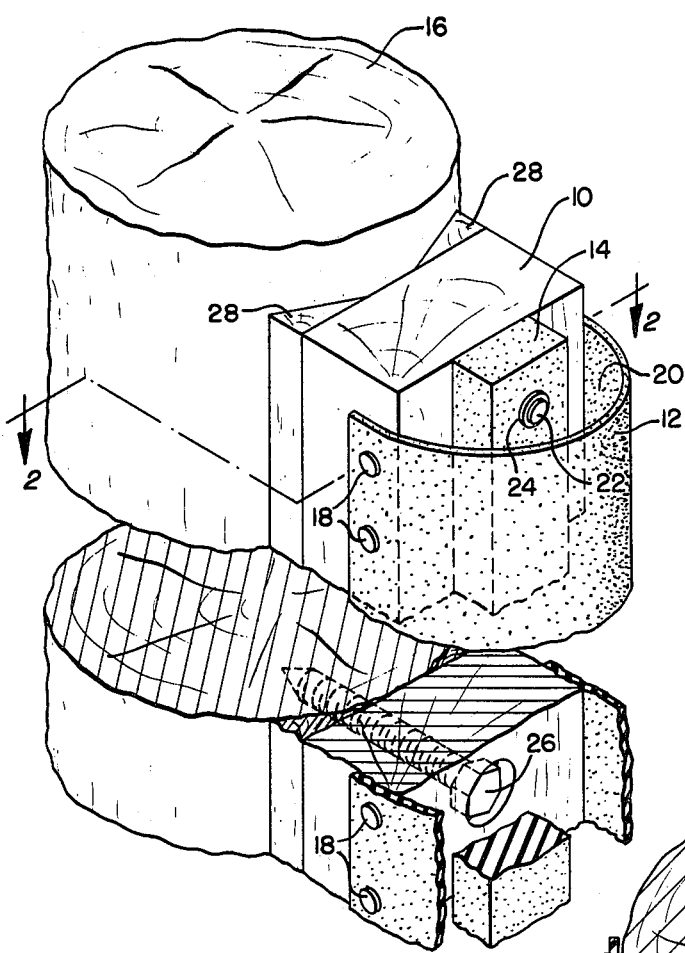
FIG. 1 is a fragmentary perspective view, partly broken away, illustrating a first embodiment of the invention.
Figure 2:
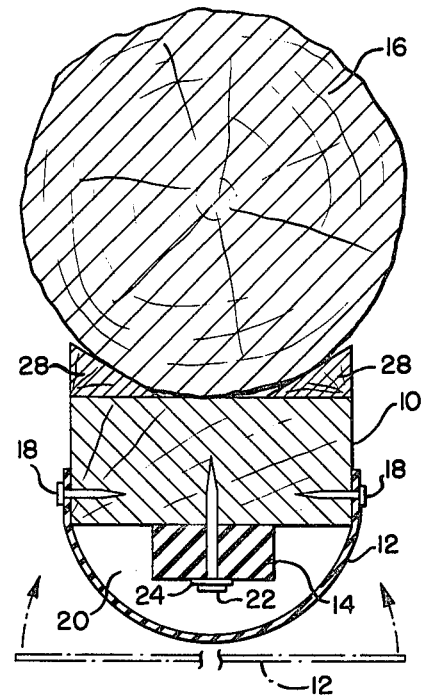
FIG. 2 is a horizontal sectional view taken along line 2—2 of FIG. 1.

In the embodiment illustrated in FIGS. 1 and 2, a marine fender in accordance with the invention comprises a support 10, a resilient sheet or wrap 12, and an elastomeric core 14. In this embodiment the support 10 is a backing member that is attached to the ultimate foundation or support 16, although, as later described, the backing member may be eliminated if desired. The invention is especially useful on wooden pilings, such as the support 16, associated with or forming part of a dock or slip, for example. However, by virtue of the backing member 10, the invention may be readily applied to other foundations, such as concrete dock structures, for example. Backing member 10 is preferably a wooden structural member, such as a 2"×4" or 4"×4".

Sheet 12 is preferably a generally rectangular, substantially flat sheet of material (described more fully later) that is manually bent into a smoothly curved shape as seen in transverse cross section (see FIG. 2) and that is attached to the support 10 along opposite longitudinal edges of the sheet. To attach the sheet to the support, one or more rows of stainless steel nails 18 (preferably with serrated shanks) may be driven through the sheet material into the wooden support 10, as shown.

The bending of the sheet 12 into a curved configuration and the attachment of the sheet to the support 10 provide an unpressurized deflection space 20 between the sheet and the support. Core 14 is disposed within this space, occupying only a portion of the space, and is mounted on the support 10. The core may be attached to the support by stainless steel nails 22 provided with washers 24. Core 14 may be an elongated solid strip of rectangular configuration positioned centrally on an abutting face of the backing member 10 and extending longitudinally of the backing member.

In the embodiment of FIGS. 1 and 2, the fender may be preassembled and later attached as a unit to the piling 16, as by lag screws 26 extending through the backing member 10 into the piling 16. The screws are preferably countersunk into the backing member, as shown in FIG. 1. To provide access to the lag screws, corresponding openings (not shown) may be provided in the sheet 12 aligned with the lag screws. If the core 14 is suspended by nails near the top of the core (e.g., two nails spaced 6 inches apart), the core may be moved aside to gain access to the lag screws. Alternatively, the core may be made in successive strip sections with spaces therebetween for access to the lag screws.

Wooden wedges 28 may be provided between the backing member 10 and support 16 to stabilize the mounting of the fender on the piling. The wedges may be nailed to backing member 10 and/or glued to the backing member by an epoxy glue, for example. The wedges and the backing member are preferably formed of a strong rot-resistant wood, such as Greenheart or A. teak, to resist damage by Toredo worms.

Core 14 may be formed of synthetic rubber, for example, such as synthetic polyisoprene, with a durometer hardness of about 60 to 80, a maximum tensile strength of about 4500 psi, a maximum elongation of about 650%, and with a base polymer specific gravity of about 0.91. The core should have high resilience and excellent impact strength. Suitable core materials are available from Atlantic India Rubber Co. of Chicago, Ill. and from Minex Corp. of Beckley, W. Va. It is highly preferred, in accordance with the invention, that the core 14 be spaced from the sheet 12 so that the sheet can deflect before engaging the core. The core may have cross dimensions of 1½" by ¾", for example, with the longer cross dimension parallel to the face of the backing member 10 on which the core is mounted. If the width of the support or backing member 10 is designated W (see FIG. 5) then the maximum spacing dimension between the inside surface of the sheet 12 and the opposed face of the support 10 (perpendicular to W) is preferably about ⅓ W. Thus, if support 10 is four inches wide, for example, the maximum spacing dimension is 1⅓".

Sheet 12 is preferably formed of conveyor belting material of the type comprising a loosely woven textile fabric carcass of synthetic filament yarns or cords (e.g., nylon, rayon, or polyester) impregnated with a fluid polyvinyl compound (e.g., polyvinyl chloride) that is gelled about the carcass from a liquid state to fill the interstices of the carcass and to coat the carcass with an elastomer. Such conveyor belting material, employed in coal mines, for example, is marketed by Georgia Duck & Cordage Mill, Scottdale, Ga., under the trademark "VINYLOK," by Long-Airdox Co. of Oakhill, W. Va., under the trademark "POLY-VINYLAD," and by J. H. Fenner Co., Ltd. of Middletown, Conn. under the trademark "FENAPLAST CXC". The Fenaplast material and the method of making the same are described in U.S. Pat. No. 2,800,701, issued July 30, 1957, and British Pat. No. 770,524 (1957), both of which are incorporated herein by reference. "POLY-VINYLAD," type PV-600, may be purchased in rolls of 42" to 60" width, for example, and cut to appropriate width (e.g., 12") and length (e.g., 9'). Type PV-600 has a thickness of 10/32", but the thickness of the sheet to be used depends upon the magnitude of the impacts to be accommodated. When the sheet material is unrolled and cut to an appropriate length and width, a substantially flat rectangular sheet is formed that may be nailed along one longitudinal edge to the support, manually bent to the desired curved configuration, and then nailed along the opposite longitudinal edge to the support.

An important discovery underlying one aspect of the invention is that conveyor belting material of the foregoing type is admirably suited to a marine fender application. The material is strong, resilient, abrasion-resistant, maintains its flexibility under a wide range of temperatures, holds fasteners well, resists moisture rot, mildew, acids, and oils, has low stretch (less than 2%), and stands up well when exposed to sea water and sunlight. Bending of the material to the desired curved configuration during manufacture of the fender prestresses the material, which appears to enhance its performance in the invention. Upon impact with the rub rail of a boat, the sheet deflects resiliently toward the support 10, absorbing impact energy as the smoothly curved configuration is deformed. When the impact force is relieved, the sheet returns to its original smoothly curved configuration. The sheet is capable of withstanding hundreds of thousands of heavy blows without noticeable damage.

If the impact force upon the sheet 12 is sufficient to cause the sheet to deflect into engagement with the core 14, resilient compression and temporary deformation of the elastomeric core assist the sheet 12 in absorbing the impact load. The core also serves as a buffer to prevent direct collapse of the sheet 12 upon the support 10.

Figure 4:
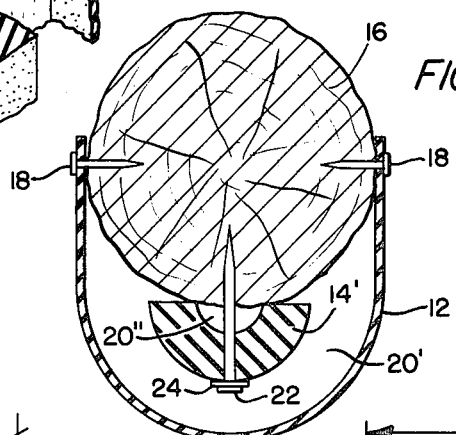
FIG. 4 is a horizontal sectional view taken along line 4—4 of FIG. 3.
Figure 3:
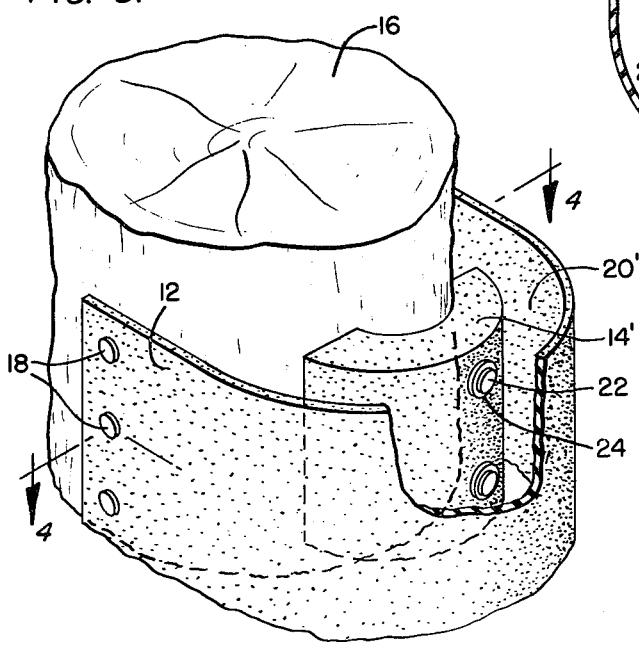
FIG. 3 is a fragmentary perspective view, partly broken away, of a second embodiment of the invention.

FIGS. 3 and 4 illustrate an embodiment of the invention intended for heavier impact loads. Here the piling 16 directly supports the sheet 12 and a modified core 14', although a backing member such as member 10 may be employed in this embodiment also, if desired. The longitudinal edges of the sheet 12 are nailed to the piling, the sheet being bent in situ to the desired smoothly curved configuration in transverse cross section. Again, a deflection space 20' is provided between sheet 12 and support 16. Core 14' has an arcuate transverse cross section and is preferably half of a hollow elastomeric cylinder, e.g., 4" O.D. and 1½" I.D. cut longitudinally. The core material preferably has the characteristics previously described with respect to core 14.

Core 14" may be suspended from its upper portion by nails 22 driven through the core into the support 16 as shown in FIG. 4. A pair of nails six inches apart near the upper end of the core and provided with washers 24 is sufficient to suspend the core on the support 16.

In the embodiment of FIGS. 3 and 4 there are two deflection spaces. In addition to space 20' between sheet 12 and support 16 (in which the core is located spaced from the sheet as before), there is another space 20" between core 14' and the support 16. If the sheet 12 is deflected sufficiently to engage the core 14', the core 14' may then deflect toward the support 16, while being resiliently compressed, to absorb the impact load.

Figure 5:
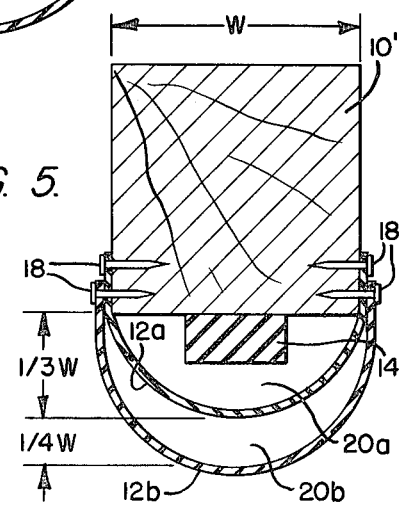
FIG. 5 is a horizontal sectional view illustrating a modification of the invention.

As shown in FIG. 5, multiple sheets 12a and 12b may be employed together to provide a pair of deflection spaces 20a and 20b. Each sheet is bent to the desired smoothly curved configuration in transverse cross section and is then nailed along its longitudinal edges to a support, which in this instance is a backing member 10' (although the sheets may be nailed directly to a piling 16, for example). The maximum spacing dimension between the inner surface of sheet 12a and the opposed face of support 10' is preferably about ⅛ W, and the maximum spacing dimension between the inner surface of sheet 12b and the outer surface of sheet 12a is preferably about ¼ W. Upon impact with the rub rail of a boat, sheet 12b deflects and absorbs energy. If the impact is sufficient, sheet 12b will engage sheet 12a, and both sheets will deflect and absorb energy.

A single sheet of conveyor belting material of the type described previously, even without a core, is sufficient to absorb light marine impacts, while two sheets employed without a core provide additional impact absorption. A core 14 employed in the manner of FIG. 5 (or a core 14' employed in the manner of FIG. 4) provides additional impact absorption. If desired, more than two sheets may be employed, with deflection spaces between successive sheets. Also, in any embodiment of the invention successive sheets may be used in contact with each other, either to provide additional effective thickness of the sheet material or to cover an inner sheet that has become worn through long use. This is a simple and effective way to tailor the marine fender of the invention to a particular application and to extend its effective life. In the event of abrasion damage to the sheet material after long hard use, repairs may be easily made by coating the outer surface of the sheet, with polyurethane coating, for example.

While several embodiments of the invention have been shown and described, it will be apparent to those skilled in the art that changes can be made in these embodiments without departing from the principles and spirit of the invention, the scope of which is defined in the appended claims. The terms "longitudinal" and "transverse" as used to describe the sheet 12, for example, are relative terms. In most applications the longitudinal edges of the sheet will be arranged vertically when the fender is installed and the transverse cross section of the sheet will be horizontal. This does not preclude bumpers or fenders of the invention in which the sheet is wider than it is long, however.

The invention claimed is:

1. A marine fender adapted to absorb impact loads, comprising a support, a prestressed resilient sheet having a textile fabric carcass impregnated with an elastomeric material, the sheet being bent from a substantially flat state into a configuration that is curved in transverse cross section and that is thereby prestressed for absorbing impact loads, the sheet being attached along opposite longitudinal edges to said support so as to define an unpressurized deflection space between the sheet and the support, and a core of elastomeric material disposed within the deflection space and attached to the support, the core occupying only a portion of the deflection space.

2. A marine fender in accordance with claim 1, wherein the carcass is loosely woven of synthetic cords and impregnated and coated with a polyvinyl compound gelled about the carcass from a liquid state.

3. A marine fender in accordance with claim 1, wherein the core is a solid strip.

4. A marine fender in accordance with claim 1, wherein the core has an arcuate cross section.

5. A marine fender in accordance with claim 1, wherein the sheet is spaced from the core so that the sheet must deflect to engage the core.

6. A marine fender in accordance with claim 1, further comprising an additional resilient sheet shaped into a configuration that is curved in transverse cross section and attached along opposite longitudinal edges to said support so as to define a further deflection space between the sheets.

7. A marine fender in accordance with claim 1, wherein the support comprises a wooden piling and the sheet and the core are elongated and extend along the length of the piling.

8. A marine fender in accordance with claim 7, wherein the sheet is attached directly to the piling along vertical edges of the sheet by nails and the core is attached directly to the piling by nails.

9. A marine fender in accordance with claim 7, wherein the sheet and the core are attached to a backing member that is attached to the piling.

10. A marine fender in accordance with claim 1, wherein the core is formed of synthetic rubber.

11. A marine fender adapted to absorb impact loads, comprising a generally rectangular prestressed, resilient sheet of material, such as conveyor belting material, bent from a substantially flat state into a configuration that is smoothly curved in transverse cross section and that is thereby prestressed for absorbing impact loads, the sheet being attached to a support along longitudinal edges so as to define an unpressurized deflection space between the sheet and the support, the material having a woven textile fabric carcass impregnated and coated with an elastomer.

12. A marine fender in accordance with claim 11, wherein the sheet comprises a carcass of loosely woven synthetic cords impregnated with a polyvinyl compound.

13. A marine fender in accordance with claim 11, wherein the support is formed of wood and the sheet is attached to the support by nails.

14. A marine fender in accordance with claim 11, further comprising a second sheet of such material bent into a configuration that is smoothly curved in transverse cross section and attached along longitudinal edges to the support so as to define a further deflection space between the sheets.

15. A marine fender in accordance with claim 14, wherein the maximum spacing dimension between the sheets is about one-fourth of the cross dimension of the support perpendicular to the spacing dimension.

16. A marine fender in accordance with claim 11, wherein the maximum spacing dimension between the sheet and the support is about one-third of the cross dimension of the support perpendicular to the spacing dimension.

17. A method of making a marine fender adapted to absorb impact loads, comprising providing a substantially flat resilient sheet having a woven textile fabric carcass impregnated with an elastomer, prestressing the substantially flat resilient sheet by bending the sheet into a configuration that is smoothly curved in transverse cross section, and attaching the curved sheet along opposite longitudinal edges to a support so as to provide a deflection space between the prestressed sheet and the support.

18. A method in accordance with claim 17, wherein the support is formed of wood and the attaching is accomplished by nailing the sheet to the support.

19. A method in accordance with claim 17, wherein the sheet has a carcass of loosely woven synthetic cords impregnated with a polyvinyl compound.

20. A method in accordance with claim 17, wherein the support is a wooden piling and the attachment is accomplished by nailing the sheet to the piling.

21. A method in accordance with claim 17, wherein the support is a wooden backing member and the attachment is accomplished by nailing the sheet to the backing member, and wherein the backing member is later mounted on a foundation with the transverse cross section of the sheet in a horizontal plane.

22. A method in accordance with claim 17, wherein a further such sheet is bent into a configuration that is smoothly curved in transverse cross section and is attached to the support over the first-mentioned sheet so as to provide a deflection space between the sheets.

23. A method in accordance with claim 17, wherein an elastomeric core is attached to the support and thereafter the sheet is bent as aforesaid and attached to the support over the core with a space therebetween.

* * * * *